US010388961B2

(12) United States Patent
Fukumine et al.

(10) Patent No.: US 10,388,961 B2
(45) Date of Patent: Aug. 20, 2019

(54) BINDER COMPOSITION FOR SECONDARY BATTERY ELECTRODE, CONDUCTIVE MATERIAL PASTE COMPOSITION FOR SECONDARY BATTERY ELECTRODE, SLURRY COMPOSITION FOR SECONDARY BATTERY ELECTRODE, ELECTRODE FOR SECONDARY BATTERY, AND SECONDARY BATTERY

(71) Applicant: ZEON CORPORATION, Chiyoda-ku, Tokyo (JP)

(72) Inventors: Mayumi Fukumine, Tokyo (JP); Jun Mikami, Tokyo (JP); Tomoya Murase, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 95 days.

(21) Appl. No.: 15/739,763

(22) PCT Filed: Jul. 12, 2016

(86) PCT No.: PCT/JP2016/003303
§ 371 (c)(1),
(2) Date: Dec. 25, 2017

(87) PCT Pub. No.: WO2017/010093
PCT Pub. Date: Jan. 19, 2017

(65) Prior Publication Data
US 2018/0198126 A1    Jul. 12, 2018

(30) Foreign Application Priority Data

Jul. 14, 2015 (JP) ................. 2015-140755

(51) Int. Cl.
| H01M 4/62 | (2006.01) |
|---|---|
| C08K 3/04 | (2006.01) |
| C08L 9/02 | (2006.01) |
| C08L 101/00 | (2006.01) |
| H01M 4/13 | (2010.01) |
| C08L 27/16 | (2006.01) |
| H01M 10/052 | (2010.01) |
| C08C 19/02 | (2006.01) |
| C08J 3/09 | (2006.01) |
| C09D 127/16 | (2006.01) |
| C08F 236/06 | (2006.01) |

(52) U.S. Cl.
CPC ............ *H01M 4/622* (2013.01); *C08C 19/02* (2013.01); *C08J 3/096* (2013.01); *C08K 3/04* (2013.01); *C08K 3/041* (2017.05); *C08L 9/02* (2013.01); *C08L 27/16* (2013.01); *C08L 101/00* (2013.01); *C09D 127/16* (2013.01); *H01M 4/13* (2013.01); *H01M 4/62* (2013.01); *H01M 10/052* (2013.01); *C08F 236/06* (2013.01); *C08F 2500/17* (2013.01); *C08F 2800/20* (2013.01); *C08J 2327/16* (2013.01); *C08J 2447/00* (2013.01)

(58) Field of Classification Search
CPC .......... H01M 4/622; H01M 4/13; H01M 4/62; H01M 10/052; C08K 3/041; C08K 3/04; C08C 19/02; C08J 3/096; C08L 27/16; C08L 9/02; C08L 101/00; C09D 127/16
See application file for complete search history.

(56) References Cited

U.S. PATENT DOCUMENTS

| 4,654,404 A * | 3/1987 | Watanabe ................. C08L 9/02 524/205 |
|---|---|---|
| 4,725,637 A * | 2/1988 | Fernyhough ............ C08L 23/04 524/271 |
| 2013/0330622 A1 | 12/2013 | Sasaki et al. |
| 2014/0121329 A1 | 5/2014 | Araki et al. |
| 2014/0163170 A1 | 6/2014 | Nakashima et al. |
| 2015/0030922 A1 | 1/2015 | Kobayashi et al. |
| 2015/0050554 A1 | 2/2015 | Fukumine et al. |

(Continued)

FOREIGN PATENT DOCUMENTS

| EP | 2239297 A1 | 10/2010 |
|---|---|---|
| JP | H0963590 A | 3/1997 |
| JP | H10188991 A | 7/1998 |

(Continued)

OTHER PUBLICATIONS

Feb. 1, 2019, the Extended European Search Report issued by the European Patent Office in the corresponding European Patent Application No. 16824078.6.

(Continued)

*Primary Examiner* — Helen Oi K Conley
(74) *Attorney, Agent, or Firm* — Kenja IP Law PC

(57) ABSTRACT

Provided are a binder composition for a secondary battery electrode that enables favorable dispersion of a conductive material when used in production of a slurry composition for a secondary battery electrode, and a slurry composition for a secondary battery electrode in which a conductive material is favorably dispersed. The binder composition for a secondary battery electrode contains a solvent and a copolymer including an alkylene structural unit and a nitrile group-containing monomer unit. The copolymer has a Mooney viscosity ($ML_{1+4}$, 100° C.) of 40 or less. The slurry composition for a secondary battery electrode contains an electrode active material, a conductive material, the aforementioned binder composition for a secondary battery electrode, and a polymer other than the aforementioned copolymer.

10 Claims, No Drawings

(56) References Cited

U.S. PATENT DOCUMENTS

2015/0050555 A1   2/2015  Fukumine et al.
2016/0185890 A1   6/2016  Yoshimura

FOREIGN PATENT DOCUMENTS

| JP | 2012204303 A   | 10/2012 |
| JP | 2013008485 A   | 1/2013  |
| JP | 2013206598 A   | 10/2013 |
| JP | WO2015064099 A1| 3/2017  |
| KR | 1020140047656 A| 4/2014  |
| WO | 2004035670 A1  | 4/2004  |
| WO | 2004035679 A1  | 4/2004  |
| WO | 2012115096 A1  | 8/2012  |
| WO | 2012165120 A1  | 12/2012 |
| WO | 2013080989 A1  | 6/2013  |
| WO | 2015046559 A1  | 4/2015  |

OTHER PUBLICATIONS

Jan. 16, 2018, International Preliminary Report on Patentability issued in the International Patent Application No. PCT/JP2016/003303.
Nov. 13, 2017, PCT Third Party Observation issued in the International Patent Application No. PCT/JP2016/003303.

* cited by examiner

BINDER COMPOSITION FOR SECONDARY BATTERY ELECTRODE, CONDUCTIVE MATERIAL PASTE COMPOSITION FOR SECONDARY BATTERY ELECTRODE, SLURRY COMPOSITION FOR SECONDARY BATTERY ELECTRODE, ELECTRODE FOR SECONDARY BATTERY, AND SECONDARY BATTERY

TECHNICAL FIELD

This disclosure relates to a binder composition for a secondary battery electrode, a conductive material paste composition for a secondary battery electrode, a slurry composition for a secondary battery electrode, an electrode for a secondary battery, and a secondary battery.

BACKGROUND

Secondary batteries such as lithium ion secondary batteries have characteristics such as compact size, light weight, high energy-density, and the ability to be repeatedly charged and discharged, and are used in a wide range of applications. Therefore, studies have been carried out in recent years with the objective of further raising the performance of secondary batteries through improvement of electrodes and other battery components.

An electrode used in a secondary battery such as a lithium ion secondary battery normally includes a current collector and an electrode mixed material layer (positive electrode mixed material layer or negative electrode mixed material layer) formed on the current collector. This electrode mixed material layer is formed by, for example, applying a slurry composition containing an electrode active material, a binder-containing binder composition, and so forth onto the current collector, and then drying the applied slurry composition.

In order to further improve the performance of secondary batteries, attempts have been made in recent years to improve binder compositions used in electrode mixed material layer formation.

In one specific example described in PTL 1, a binder composition containing a rubber polymer, such as acrylate rubber, that has a polymethylene-type saturated main chain and does not contain fluorine atoms and a non-aromatic organic compound solvent having a carbon number of 2 to 20 and a boiling point of 85° C. to 350° C. is used to enable strong adherence between an electrode active material and a current collector, and to improve secondary battery cycle characteristics.

In another example described in PTL 2, a binder composition that contains a mixture of a fluororubber and a hydrogenated nitrile rubber as a binder is used to improve secondary battery cycle characteristics.

CITATION LIST

Patent Literature

PTL 1: JP H10-188991 A
PTL 2: JP H9-63590 A

SUMMARY

Technical Problem

An electrode mixed material layer, and particularly a positive electrode mixed material layer, of a secondary battery may contain a conductive material to ensure electrical contact amongst an electrode active material. Moreover, in a slurry composition used in formation of an electrode mixed material layer that contains a conductive material, it is necessary to favorably disperse a conductive material from a viewpoint of enabling favorable formation of the electrode mixed material layer and improving secondary battery performance.

However, in a slurry composition containing an electrode active material, a conductive material, and a conventional binder composition such as described above, there are cases in which the conductive material aggregates and cannot be favorably dispersed. Consequently, in an electrode formed using a slurry composition that contains an electrode active material, a conductive material, and a conventional binder composition such as described above, the conductive material may be unevenly distributed in the electrode mixed material layer, and thus it may not be possible to favorably form an electrode mixed material layer having high uniformity. Moreover, in a secondary battery in which this electrode is used, uneven distribution of the conductive material in the electrode mixed material layer may cause reduction of output characteristics and lead to occurrence of a side reaction due to charge concentration.

Accordingly, an objective of this disclosure is to provide a binder composition for a secondary battery electrode and a conductive material paste composition for a secondary battery electrode that enable favorable dispersion of a conductive material when used in production of a slurry composition for a secondary battery electrode.

Another objective of this disclosure is to provide a slurry composition for a secondary battery electrode in which a conductive material is favorably dispersed.

Yet another objective of this disclosure is to provide an electrode for a secondary battery that enables sufficient improvement of battery characteristics of a secondary battery and a secondary battery having excellent battery characteristics such as output characteristics.

Solution to Problem

The inventors conducted diligent investigation with the aim of solving the problems set forth above. Through this investigation, the inventors discovered that it is possible to favorably disperse a conductive material in a slurry composition for a secondary battery electrode by using a binder composition for a secondary battery electrode that contains a copolymer including an alkylene structural unit and a nitrile group-containing monomer unit, and having a specific Mooney viscosity ($ML_{1+4}$, 100° C.). Moreover, the inventors discovered that in production of a slurry composition for a secondary battery electrode using this binder composition for a secondary battery electrode, a conductive material can be more favorably dispersed by obtaining the slurry composition for a secondary battery electrode through addition of an electrode active material and the like to a conductive material paste composition for a secondary battery electrode that contains the binder composition for a secondary battery electrode and the conductive material. The inventors completed the present disclosure based on these findings.

Specifically, this disclosure aims to advantageously solve the problems set forth above by disclosing a binder composition for a secondary battery electrode comprising: a copolymer including an alkylene structural unit and a nitrile group-containing monomer unit; and a solvent, wherein the copolymer has a Mooney viscosity ($ML_{1+4}$, 100° C.) of 40 or less. When a copolymer including an alkylene structural unit and a nitrile group-containing monomer unit, and having a Mooney viscosity ($ML_{1+4}$, 100° C.) of 40 or less is included in this manner, it is possible to favorably disperse a conductive material when the binder composition for a secondary battery electrode is used to produce a slurry composition for a secondary battery electrode.

In this disclosure, the "Mooney viscosity ($ML_{1+4}$, 100° C.)" can be measured in accordance with JIS K 6300-1 at a temperature of 100° C.

In the presently disclosed binder composition for a secondary battery electrode, the copolymer preferably includes the alkylene structural unit in a proportion of at least 40 mass % and not more than 80 mass %. As a result of the proportion constituted by the alkylene structural unit in the copolymer being at least 40 mass % and not more than 80 mass %, conductive material dispersibility in production of a slurry composition for a secondary battery electrode can be further increased.

In this disclosure, the proportions constituted by repeating units (structural units and monomer units) in the copolymer can be measured by a nuclear magnetic resonance (NMR) method such as $^1$H-NMR.

In the presently disclosed binder composition for a secondary battery electrode, the copolymer preferably includes the nitrile group-containing monomer unit in a proportion of at least 10 mass % and not more than 55 mass %. As a result of the proportion constituted by the nitrile group-containing monomer unit in the copolymer being at least 10 mass % and not more than 55 mass %, it is possible to increase the peel strength and flexibility of an electrode mixed material layer formed using a slurry composition for a secondary battery electrode that contains the binder composition for a secondary battery electrode.

In the presently disclosed binder composition for a secondary battery electrode, the copolymer preferably does not substantially include a hydrophilic group-containing monomer unit. As a result of the copolymer not substantially including a hydrophilic group-containing monomer unit, conductive material dispersibility in production of a slurry composition for a secondary battery electrode can be further increased.

In this disclosure, "does not substantially include a hydrophilic group-containing monomer unit" means that the proportion constituted by a hydrophilic group-containing monomer unit among all repeating units in the copolymer is 0 mass % or more, but less than 0.05 mass %.

Moreover, this disclosure aims to advantageously solve the problems set forth above by disclosing a conductive material paste composition for a secondary battery electrode comprising: any one of the binder compositions for a secondary battery electrode set forth above; and a conductive material. Through use of any one of the foregoing binder compositions for a secondary battery electrode in this manner, it is possible to obtain a conductive material paste composition for a secondary battery electrode in which a conductive material is favorably dispersed. Moreover, by producing a slurry composition for a secondary battery electrode through addition of an electrode active material and the like to this conductive material paste composition for a secondary battery electrode, the conductive material can be more favorably dispersed in the slurry composition.

Furthermore, this disclosure aims to advantageously solve the problems set forth above by disclosing a slurry composition for a secondary battery electrode comprising: an electrode active material; a conductive material; any one of the binder compositions for a secondary battery electrode set forth above; and a polymer other than the copolymer. By using a polymer other than the copolymer in combination with any one of the foregoing binder compositions for a secondary battery electrode containing the copolymer in this manner, a slurry composition for a secondary battery electrode in which a conductive material is favorably dispersed can be easily obtained.

In the presently disclosed conductive material paste composition for a secondary battery electrode and slurry composition for a secondary battery electrode set forth above, the conductive material preferably has a BET specific surface area of at least 100 $m^2$/g and not more than 2,500 $m^2$/g. As a result of the BET specific surface area of the conductive material being at least 100 $m^2$/g and not more than 2,500 $m^2$/g, battery characteristics such as output characteristics can be sufficiently improved while ensuring conductive material dispersibility. Note that although a conductive material having a large BET specific surface area normally tends to aggregate and be hard to disperse, use of the presently disclosed binder composition for a secondary battery electrode enables favorable dispersion of even a conductive material having a large BET specific surface area.

In this disclosure, "BET specific surface area" refers to the nitrogen adsorption specific surface area measured by the BET method and can be measured in accordance with ASTM D3037-81.

Also, this disclosure aims to advantageously solve the problems set forth above by disclosing an electrode for a secondary battery comprising an electrode mixed material layer formed using any one of the slurry compositions for a secondary battery electrode set forth above. Use of any one of the foregoing slurry compositions for a secondary battery electrode in this manner enables favorable formation of the electrode mixed material layer and sufficient improvement of battery characteristics of a secondary battery in which the electrode for a secondary battery is used.

Moreover, this disclosure aims to advantageously solve the problems set forth above by disclosing a secondary battery comprising the electrode for a secondary battery set forth above. Use of the foregoing electrode for a secondary battery in this manner enables sufficient improvement of battery characteristics such as output characteristics.

Advantageous Effect

According to this disclosure, it is possible to provide a binder composition for a secondary battery electrode and a conductive material paste composition for a secondary battery electrode that enable favorable dispersion of a conductive material when used in production of a slurry composition for a secondary battery electrode.

Moreover, according to this disclosure, it is possible to provide a slurry composition for a secondary battery electrode in which a conductive material is favorably dispersed.

Furthermore, according to this disclosure, it is possible to provide an electrode for a secondary battery that enables sufficient improvement of battery characteristics of a secondary battery and a secondary battery having excellent battery characteristics such as output characteristics.

DETAILED DESCRIPTION

The following provides a detailed description of embodiments of the present disclosure.

Herein, the presently disclosed binder composition for a secondary battery electrode can be used in production of a slurry composition for a secondary battery electrode. Moreover, the presently disclosed binder composition for a secondary battery electrode is preferably used in production of a slurry composition for a secondary battery electrode after being mixed with a conductive material to produce a conductive material paste composition for a secondary battery electrode that contains the binder composition for a secondary battery electrode and the conductive material. A slurry composition for a secondary battery electrode produced using the presently disclosed binder composition for a secondary battery electrode can be used in formation of an electrode for a secondary battery such as a lithium ion secondary battery. Furthermore, a feature of the presently disclosed secondary battery is that an electrode for a secondary battery formed using the presently disclosed slurry composition for a secondary battery electrode is used therein.

Note that the presently disclosed binder composition for a secondary battery electrode, conductive material paste composition for a secondary battery electrode, and slurry composition for a secondary battery electrode can be particularly suitably used in formation of a secondary battery positive electrode.

(Binder Composition for Secondary Battery Electrode)

The presently disclosed binder composition for a secondary battery electrode contains a copolymer (A) including an alkylene structural unit and a nitrile group-containing monomer unit, and a solvent, and may optionally further contain other components that can be used in secondary battery electrodes. A feature of the presently disclosed binder composition for a secondary battery electrode is that the copolymer (A) has a Mooney viscosity ($ML_{1+4}$, 100° C.) of 40 or less.

When the presently disclosed binder composition for a secondary battery electrode is used in production of a slurry composition for a secondary battery electrode that contains an electrode active material and a conductive material, a polymer other than the copolymer (A) (hereinafter, also referred to as "another polymer" or "the other polymer") is typically used therewith. In a case in which the presently disclosed binder composition for a secondary battery electrode is not used in combination with another polymer, dense components such as an electrode active material tend to easily sediment in production of a slurry composition for a secondary battery electrode due to the low Mooney viscosity of the copolymer (A), and thus it may not be possible to favorably produce a slurry composition for a secondary battery electrode.

The presently disclosed binder composition for a secondary battery electrode enables favorable dispersion of a conductive material when used in production of a slurry composition for a secondary battery electrode as a result of containing a copolymer (A) that includes an alkylene structural unit. Moreover, the presently disclosed binder composition for a secondary battery electrode enables an electrode mixed material layer formed using the binder composition for a secondary battery electrode to display excellent peel strength and flexibility as a result of containing a copolymer (A) that includes a nitrile group-containing monomer unit. Furthermore, as a result of the copolymer (A) having a Mooney viscosity of 40 or less, the presently disclosed binder composition for a secondary battery electrode can inhibit aggregation of a conductive material and enables favorable dispersion of the conductive material through favorable adsorption of the copolymer (A) onto the surface of the conductive material to form a thin dispersion stabilizing layer. Accordingly, through use of the presently disclosed binder composition for a secondary battery electrode, it is possible to produce a slurry composition for a secondary battery electrode in which a conductive material is favorably dispersed, and it is possible to form an electrode mixed material layer of an electrode using this slurry composition for a secondary battery electrode such as to obtain a secondary battery having excellent battery characteristics such as output characteristics.

<Copolymer (A)>

The copolymer (A) favorably disperses a conductive material in a slurry composition for a secondary battery electrode produced using the binder composition. Moreover, in an electrode produced by forming an electrode mixed material layer on a current collector using a slurry composition for a secondary battery electrode produced using the binder composition, the copolymer (A) holds components contained in the electrode mixed material layer so that these components do not detach from the electrode mixed material layer (i.e., the copolymer (A) functions as a binder).

The copolymer (A) is required to include an alkylene structural unit and a nitrile group-containing monomer unit as repeating units, and may optionally further include repeating units other than the alkylene structural unit and the nitrile group-containing monomer unit (hereinafter, also referred to as "other repeating units").

[Alkylene structural unit]

The alkylene structural unit is a repeating unit composed only of an alkylene structure represented by a general formula —$C_nH_2$— (n is an integer of 2 or more). As a result of the copolymer (A) including the alkylene structural unit, when the copolymer (A) is used in production of a slurry composition for a secondary battery electrode that contains a conductive material, dispersibility of the conductive material can be improved and aggregation of the conductive material in the slurry composition can be inhibited, which can increase dispersion stability of the slurry composition.

Although the alkylene structural unit may be linear or branched, the alkylene structural unit is preferably linear (i.e., the alkylene structural unit is preferably a linear alkylene structural unit) from a viewpoint of further improving dispersion stability of a slurry composition for a secondary battery electrode. Moreover, the carbon number of the alkylene structural unit is preferably 4 or more (i.e., n in the preceding general formula is preferably an integer of 4 or more) from a viewpoint of further improving dispersion stability of a slurry composition for a secondary battery electrode.

Examples of methods by which the alkylene structural unit can be introduced into the copolymer (A) include, but are not specifically limited to, the following methods (1) and (2).

(1) A method involving producing a copolymer from a monomer composition containing a conjugated diene monomer, and hydrogenating the resultant copolymer to convert a conjugated diene monomer unit to an alkylene structural unit (2) A method involving producing a copolymer from a monomer composition containing a 1-olefin monomer Of these methods, method (1) is preferable in terms of ease of production of the copolymer (A).

Examples of conjugated diene monomers that can be used include conjugated diene compounds having a carbon number of 4 or more such as 1,3-butadiene, isoprene, 2,3-dimethyl-1,3-butadiene, and 1,3-pentadiene. Of these conjugated diene monomers, 1,3-butadiene is preferable. In other words, the alkylene structural unit is preferably a structural unit obtained through hydrogenation of a conjugated diene monomer unit (i.e., the alkylene structural unit is preferably a hydrogenated conjugated diene unit), and is more preferably a structural unit obtained through hydrogenation of a 1,3-butadiene unit (i.e. the alkylene structural unit is more preferably a hydrogenated 1,3-butadiene unit). Selective hydrogenation of the conjugated diene monomer unit can be carried out by a commonly known method such as an oil-layer hydrogenation method or a water-layer hydrogenation method.

Examples of 1-olefin monomers that can be used include ethylene, propylene, 1-butene, and 1-hexene.

One of these conjugated diene monomers or 1-olefin monomers may be used individually, or two or more of these conjugated diene monomers or 1-olefin monomers may be used in combination.

The percentage content of the alkylene structural unit in the copolymer (A) when all repeating units (total of structural units and monomer units) in the copolymer (A) are taken to be 100 mass % is preferably 40 mass % or more, more preferably 50 mass % or more, and even more preferably 60 mass % or more, and is preferably 80 mass % or less, and more preferably 70 mass % or less. When the percentage content of the alkylene structural unit is set as at least any of the lower limits set forth above, conductive material dispersibility in a slurry composition can be further improved, and slurry composition dispersion stability can be sufficiently increased. Moreover, when the percentage content of the alkylene structural unit is set as not more than any of the upper limits set forth above, reduction in solubility of the copolymer (A) in solvents such as N-methylpyrrolidone (NMP) can be inhibited and the copolymer (A) can display a sufficient conductive material dispersing effect.

[Nitrile Group-Containing Monomer Unit]

The nitrile group-containing monomer unit is a repeating unit that is derived from a nitrile group-containing monomer. The copolymer (A) can display excellent flexibility and binding capacity as a result of including the nitrile group-containing monomer unit. Consequently, an electrode mixed material layer that is formed using a slurry composition for a secondary battery electrode containing the presently disclosed binder composition for a secondary battery electrode can display excellent peel strength and flexibility.

Examples of nitrile group-containing monomers that can be used to form the nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these monomers, acrylonitrile and methacrylonitrile are preferable, and acrylonitrile is more preferable as a nitrile group-containing monomer from a viewpoint of increasing binding capacity of the copolymer (A).

One of these nitrile group-containing monomers may be used individually, or two or more of these nitrile group-containing monomers may be used in combination.

The percentage content of the nitrile group-containing monomer unit in the copolymer (A) when all repeating units in the copolymer (A) are taken to be 100 mass % is preferably 10 mass % or more, more preferably 20 mass % or more, even more preferably 25 mass % or more, and particularly preferably 30 mass % or more, and is preferably 55 mass % or less, more preferably 50 mass % or less, and even more preferably 40 mass % or less. When the percentage content of the nitrile group-containing monomer unit in the copolymer (A) is set as at least any of the lower limits set forth above, binding capacity of the copolymer (A) can be improved, and peel strength of an electrode mixed material layer formed using the binder composition can be sufficiently increased. Moreover, when the percentage content of the nitrile group-containing monomer unit in the copolymer (A) is set as not more than any of the upper limits set forth above, flexibility of the copolymer (A) can be increased, which suppresses reduction in flexibility of an electrode mixed material layer formed using the binder composition.

[Other Repeating Units]

No specific limitations are placed on other repeating units that may be included besides the alkylene structural unit and the nitrile group-containing monomer unit described above. Examples of such other repeating units include repeating units derived from known monomers that are copolymerizable with the monomers described above, such as a (meth) acrylic acid ester monomer unit and a hydrophilic group-containing monomer unit. Moreover, such other repeating units may include an aromatic vinyl monomer unit derived from an aromatic vinyl monomer such as styrene, α-methylstyrene, butoxystyrene, or vinylnaphthalene.

One of these monomers may be used individually, or two or more of these monomers may be used in combination. Note that in this disclosure, "(meth)acryl" is used to indicate "acryl" and/or "methacryl".

Examples of (meth)acrylic acid ester monomers that can be used to form the (meth)acrylic acid ester monomer unit include alkyl esters of acrylic acid such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl esters of methacrylic acid such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

Examples of hydrophilic group-containing monomers that can be used to form the hydrophilic group-containing monomer unit include polymerizable monomers that have a hydrophilic group. Specific examples of hydrophilic group-containing monomers include carboxylic acid group-containing monomers, sulfonate group-containing monomers, phosphate group-containing monomers, and hydroxy group-containing monomers.

Examples of carboxylic acid group-containing monomers include monocarboxylic acids, derivatives of monocarboxylic acids, dicarboxylic acids, acid anhydrides of dicarboxylic acids, and derivatives of these dicarboxylic acids and acid anhydrides.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid esters such as methyl allyl maleate, diphenyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxyl group upon hydrolysis can also be used as a carboxylic acid group-containing monomer. Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfonate group-containing monomers include vinyl sulfonic acid, methyl vinyl sulfonic acid, (meth)allyl sulfonic acid, styrene sulfonic acid, (meth)acrylic acid-2-ethyl sulfonate, 2-acrylamido-2-methylpropane sulfonic acid, and 3-allyloxy-2-hydroxypropane sulfonic acid.

In this disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In this disclosure, "(meth)acryloyl" is used to indicate "acryloyl" and/or "methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^1-COO-(C_qH_{2q}O)_p-H$ (where p represents an integer of 2 to 9, q represents an integer of 2 to 4, and $R^1$ represents a hydrogen atom or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

The percentage content of such other repeating units in the copolymer (A) is preferably 25 mass % or less, more preferably 10 mass % or less, and even more preferably 1 mass % or less, and it is particularly preferable that the copolymer (A) does not include any of such other repeating units. In other words, the copolymer (A) is preferably composed of only the alkylene structural unit and the nitrile group-containing monomer unit. Through use of a copolymer (A) in which the percentage content of such other repeating units is small, a conductive material can be favorably dispersed.

In particular, it is preferable that the above-described copolymer (A) does not substantially include a hydrophilic group-containing monomer unit. In a case in which the copolymer (A) includes a hydrophilic group-containing monomer unit as another repeating unit, the hydrophilic group promotes conductive material aggregation. As a result, it may be difficult to produce a slurry composition in which a conductive material is favorably dispersed.

[Mooney Viscosity ($ML_{1+4}$, 100° C.)]

The Mooney viscosity ($ML_{1+4}$, 100° C.) of the copolymer (A) is required to be 40 or less. Moreover, the Mooney viscosity ($ML_{1+4}$, 100° C.) of the copolymer (A) is preferably less than 35, more preferably 30 or less, and even more preferably 25 or less. Furthermore, the Mooney viscosity ($ML_{1+4}$, 100° C.) of the copolymer (A) is preferably 5 or more, more preferably 10 or more, and even more preferably 15 or more. If the Mooney viscosity of the copolymer (A) is more than the upper limit set forth above, the copolymer (A) is not readily adsorbed onto the surface of a conductive material and aggregation of the conductive material cannot be sufficiently inhibited, which makes it difficult to produce a slurry composition in which the conductive material is favorably dispersed. On the other hand, if the Mooney viscosity of the copolymer (A) is less than the lower limit set forth above, adsorption stability of the copolymer (A) with respect to the conductive material may be reduced, and dispersion stability of the conductive material may be reduced.

The Mooney viscosity of the copolymer (A) can be adjusted, for example, by altering the composition, structure (for example, straight chain ratio), molecular weight, or gel content ratio of the copolymer (A), altering production conditions of the copolymer (A) (for example, the used amount of chain transfer agent, polymerization temperature, or conversion rate at the end point of polymerization), and so forth. In one specific example, the Mooney viscosity of the copolymer (A) can be reduced by increasing the amount of chain transfer agent used in production of the copolymer (A). In another example, the Mooney viscosity of the copolymer (A) can be reduced by applying mechanical shear force to a copolymer including an alkylene structural unit and a nitrile group-containing monomer unit using a roll, a kneader, or the like.

The iodine value of the copolymer (A) is preferably 3 mg/100 mg or more, and more preferably 8 mg/100 mg or more, and is preferably 60 mg/100 mg or less, more preferably 30 mg/100 mg or less, and even more preferably 10 mg/100 mg or less. When the iodine value of the copolymer (A) is within any of the ranges set forth above, the copolymer is stable in terms of chemical structure at high-potential and electrode structure can be maintained even when cycling is performed over a long period, which means that a secondary battery having excellent high-temperature cycle characteristics can be provided. Note that the iodine value can be determined in accordance with JIS K 6235:2006.

[Production Method of Copolymer (A)]

Although no specific limitations are placed on the production method of the copolymer (A) set forth above, the copolymer (A) may be produced, for example, by polymerizing a monomer composition containing the above-described monomers to obtain a copolymer, optionally in the presence of a chain transfer agent, and then hydrogenating the resultant copolymer. The hydrogenated copolymer may optionally be subjected to application of shear force to adjust the Mooney viscosity thereof.

Herein, the percentage content of each monomer in the monomer composition used to produce the copolymer (A) can be set in accordance with the percentage content of each repeating unit in the copolymer (A).

The method of polymerization is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction.

Furthermore, no specific limitations are placed on the method by which the copolymer is hydrogenated, and a normal method using a catalyst may be adopted (for example, refer to WO 2012/165120 A1, WO 2013/080989 A1, and JP 2013-8485 A).

<Solvent>

The solvent of the binder composition for a secondary battery electrode may be an organic solvent, but is not specifically limited thereto. Examples of organic solvents that can be used include alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide-based polar organic solvents such as N,N-dimethylformamide and N-methylpyrrolidone (NMP); and aromatic hydrocarbons such as toluene, xylene, chlorobenzene, ortho-dichlorobenzene, and para-dichlorobenzene. One of these solvents may be used individually, or two or more of these solvents may be used as a mixture.

Of these examples, NMP is preferable as the solvent.

<Other Components>

Other than the above components, the presently disclosed binder composition for a secondary battery electrode may contain components such as a reinforcing agent, a leveling agent, a viscosity modifier, an electrolysis solution additive, and the like. These other components are not specifically limited so long as they do not affect the battery reactions and may be selected from commonly known components such as those described in WO 2012/115096 A1. One of such components may be used individually, or two or more of such components may be used in combination in a freely selected ratio.

(Slurry Composition for Secondary Battery Electrode)

The presently disclosed slurry composition for a secondary battery electrode contains an electrode active material, a conductive material, the above-described binder composition, and another polymer, and may optionally further contain other components. In other words, the presently disclosed slurry composition for a secondary battery electrode contains an electrode active material, a conductive material, the above-described copolymer (A), a polymer other than the copolymer (A), and a solvent, and may optionally further contain other components. The presently disclosed slurry composition for a secondary battery electrode enables favorable dispersion of the conductive material as a result of containing the above-described binder composition. Consequently, an electrode that includes an electrode mixed material layer formed using the presently disclosed slurry composition for a secondary battery electrode has a highly uniform electrode mixed material layer and enables a secondary battery to display excellent battery characteristics. Moreover, as a result of the presently disclosed slurry composition for a secondary battery electrode containing the above-described binder composition and another polymer, sedimentation of components in the slurry composition can be inhibited, and the slurry composition can be easily produced.

Although the following describes, as one example, a case in which the slurry composition for a secondary battery electrode is a slurry composition for a lithium ion secondary battery positive electrode, the presently disclosed slurry composition for a secondary battery electrode is not limited to the following example.

<Electrode Active Material>

The electrode active material is a substance that accepts and donates electrons in an electrode of a secondary battery. A substance that can occlude and release lithium is normally used as a positive electrode active material for a lithium ion secondary battery.

Specific examples of positive electrode active materials for a lithium ion secondary battery that may be used include, but are not specifically limited to, known positive electrode active materials such as lithium-containing cobalt oxide ($LiCoO_2$), lithium manganate ($LiMn_2O_4$), lithium-containing nickel oxide ($LiNiO_2$), lithium-containing composite oxide of Co—Ni—Mn($Li(CoMnNi)O_2$), lithium-containing composite oxide of Ni—Mn—Al, lithium-containing composite oxide of Ni—Co—Al, olivine-type lithium iron phosphate ($LiFePO_4$), olivine-type manganese lithium phosphate ($LiMnPO_4$), a $Li_2MnO_3$—$LiNiO_2$-based solid solution, lithium rich spinel compounds represented by $Li_{1+x}Mn_{2-x}O_4$ ($0<x<2$), $Li[Ni_{0.17}Li_{0.2}CO_{0.07}Mn_{0.56}]O_2$, and $LiNi_{0.5}Mn_{1.5}O_4$.

The amount and particle diameter of the positive electrode active material may be, but are not specifically limited to, the same as those of conventionally-used positive electrode active materials.

<Conductive Material>

The conductive material ensures electrical contact amongst the electrode active material. Examples of conductive materials that can be used include conductive carbon materials such as carbon black (for example, acetylene black, Ketjen Black® (Ketjen black is a registered trademark in Japan, other countries, or both), and furnace black), single-walled or multi-walled carbon nanotubes (multi-walled carbon nanotubes are inclusive of cup-stacked carbon nanotubes), carbon nanohorns, vapor-grown carbon fiber, milled carbon fiber obtained by pyrolyzing and then pulverizing polymer fiber, single layer or multilayer graphene, and carbon nonwoven fabric sheet obtained through pyrolysis of nonwoven fabric made from polymer fiber; and fibers and foils of various metals.

One of these conductive materials may be used individually, or two or more of these conductive materials may be used in combination.

Of the conductive materials listed above, conductive carbon materials are preferable in terms of having excellent chemical stability. Moreover, carbon black and carbon nanotubes are preferable, and carbon nanotubes are more preferable as the conductive material from a viewpoint of lowering the resistance of an electrode mixed material layer formed using the slurry composition and obtaining a secondary battery having excellent output characteristics.

The average particle diameter of the carbon black is preferably at least 20 nm and not more than 50 nm, and more preferably at least 20 nm and not more than 40 nm. When the average particle diameter of the carbon black is at least any of the lower limits set forth above, aggregation of the carbon black can be inhibited and dispersibility of the carbon black as the conductive material can be ensured. Moreover, when the average particle diameter of the carbon black is not more than any of the upper limits set forth above, a good conduction path can be formed in an electrode mixed material layer and secondary battery output characteristics can be further improved.

The "average particle diameter of the carbon black" can be determined by measuring the particle diameter (maximum diameter) of each of 100 randomly selected carbon black particles using a transmission electron microscope (TEM).

The average diameter of the carbon nanotubes is preferably 5 nm or more, and more preferably 10 nm or more, and is preferably 50 nm or less, more preferably 40 nm or less, and even more preferably 20 nm or less.

Moreover, the average length of the carbon nanotubes is preferably 1 µm or more, more preferably 5 µm or more, and even more preferably 10 µm or more, and is preferably 40 µm or less, more preferably 30 µm or less, and even more preferably 20 µm or less.

When the average diameter and the average length are at least any of the lower limits set forth above, aggregation of the carbon nanotubes can be inhibited and dispersibility of the carbon nanotubes as the conductive material can be ensured. Moreover, when the average diameter and the average length of the carbon nanotubes are not more than any of the upper limits set forth above, a good conduction path can be formed in an electrode mixed material layer and secondary battery output characteristics can be further improved.

The "average diameter of the carbon nanotubes" and the "average length of the carbon nanotubes" can be determined by measuring the diameter (external diameter) and length of each of 100 randomly selected carbon nanotubes using a TEM.

The BET specific surface area of the conductive material is preferably 100 $m^2/g$ or more, and more preferably 150 $m^2/g$ or more, and is normally 2,500 $m^2/g$ or less. When the BET specific surface area of the conductive material is at least any of the lower limits set forth above, a good conduction path can be formed in an electrode mixed material layer and secondary battery output characteristics can be further improved. Moreover, when the BET specific surface area of the conductive material is not more than the upper limit set forth above, aggregation of the conductive material can be inhibited and dispersibility of the conductive material can be ensured.

It should be noted that a conductive material having a large BET specific surface area or a fibrous conductive material such as carbon nanotubes normally tends to aggregate and is difficult to disperse. However, even a conductive material having a large BET specific surface area can be favorably and stably dispersed in the presently disclosed slurry composition for a secondary battery electrode as a result of the binder composition containing the above-described copolymer (A) being used therein.

The percentage content of the conductive material in the slurry composition for a secondary battery electrode, in terms of solid content, is preferably 0.1 mass % or more, and is preferably 3 mass % or less, more preferably 2 mass % or less, and even more preferably 1 mass % or less. If the amount of the conductive material is too small, it may not be possible to ensure sufficient electrical contact amongst the electrode active material. Conversely, if the amount of the conductive material is too large, viscosity stability of the slurry composition may be reduced, and density of an electrode mixed material layer may be reduced, resulting in a secondary battery capacity that is not sufficiently high.

<Binder Composition>

The binder composition for a secondary battery electrode containing the copolymer (A) set forth above is used as the binder composition.

<Other Polymer>

The other polymer normally functions as a binder in conjunction with the copolymer (A). Examples of other polymers that can function as a binder in conjunction with the copolymer (A) set forth above include, but are not specifically limited to, polyacrylonitrile, polymethyl methacrylate, and fluorine-containing polymers such as polyvinylidene fluoride.

The percentage content of the binder (copolymer (A) and other polymer) in the slurry composition for a secondary battery electrode is, for example, preferably at least 0.45 mass % and not more than 2 mass % in terms of solid content. When the percentage content of the binder in the slurry composition is 0.45 mass % or more in terms of solid content, the conductive material can be favorably dispersed while ensuring coatability. Moreover, when the percentage content of the binder in the slurry composition is 2 mass % or less in terms of solid content, reduction in secondary battery capacity can be inhibited by inhibiting an increase in the proportion constituted by the binder in an electrode mixed material layer formed using the slurry composition.

The proportion constituted by the other polymer in the binder (total of copolymer (A) and other polymer) is preferably 30 mass % or more, more preferably 70 mass % or more, even more preferably 75 mass % or more, and particularly preferably 80 mass % or more, and is preferably 95 mass % or less, and more preferably 90 mass % or less. If the proportion constituted by the other polymer in the binder is low, it may not be possible to sufficiently inhibit sedimentation of components such as the electrode active material in production of the slurry composition for a secondary battery electrode. On the other hand, if the proportion constituted by the other polymer in the binder is high, it may not be possible to obtain an adequate conductive material dispersing effect through the copolymer (A), and thus it may not be possible to obtain a slurry composition in which a conductive material is favorably dispersed.

<Other Components>

Examples of other components that may be contained in the slurry composition include, but are not specifically limited to, the same other components that may be contained in the presently disclosed binder composition. One of such other components may be used individually, or two or more of such other components may be used in combination in a freely selected ratio.

<Production of Slurry Composition>

The slurry composition set forth above can be produced by dissolving or dispersing the above-described components in a solvent such as an organic solvent. Specifically, the slurry composition can be produced by mixing the above-described components and the solvent using a mixer such as a ball mill, a sand mill, a bead mill, a pigment disperser, a grinding machine, an ultrasonic disperser, a homogenizer, a planetary mixer, or a FILMIX. Examples of solvents that can be used in production of the slurry composition include the same solvents as can be used in the presently disclosed binder composition. Moreover, the solvent contained in the binder composition may be used as a solvent in production of the slurry composition.

Herein, no specific limitations are placed on the order in which the components are mixed in the solvent, and the components may be mixed in any order. Specifically, the components may, for example, be mixed in the order described in any one of the following (1) to (5) in production of the slurry composition.

(1) The components are mixed in a single batch.

(2) The binder composition for a secondary battery electrode containing the copolymer (A) and the other polymer are mixed to obtain a binder composition, and subsequently the electrode active material and the conductive material are simultaneously or separately added to the obtained binder composition and mixed therewith.

(3) The binder composition for a secondary battery electrode containing the copolymer (A) and the conductive material are mixed to obtain a conductive material paste composition for a secondary battery electrode, and subsequently the other polymer and the electrode active material are simultaneously or separately added to the conductive material paste composition for a secondary battery electrode and mixed therewith.

(4) The conductive material and the electrode active material are mixed, and subsequently the binder composition for a secondary battery electrode containing the copolymer (A) and the other polymer are simultaneously or separately added to the obtained mixture and mixed therewith.

(5) The conductive material, the electrode active material, and the other polymer are mixed, and subsequently the binder composition for a secondary battery electrode containing the copolymer (A) is added to the obtained mixture and mixed therewith.

Of the above examples, mixing of the components in the order described in (3) is preferable. By pre-mixing the binder composition for a secondary battery electrode and the conductive material to obtain a conductive material paste composition for a secondary battery electrode that contains the conductive material and the binder composition (i.e., that contains the conductive material, the previously described copolymer (A), and the solvent), the copolymer (A) can be favorably adsorbed onto the surface of the conductive material, thereby enabling more favorable dispersion of the conductive material. Note that although this is not a specific limitation, it is more preferable that the conductive material paste composition for a secondary battery electrode is mixed with the electrode active material after being mixed with the other polymer to obtain a conductive material dispersion liquid that contains the conductive material paste composition for a secondary battery electrode and the other polymer (i.e., that contains the conductive material, the previously described copolymer (A), the other polymer, and the solvent). The mixing proportions of components in production of the conductive material paste composition for a secondary battery electrode or the conductive material dispersion liquid may be set as proportions that yield a desired slurry composition.

(Electrode for Secondary Battery) The presently disclosed electrode for a secondary battery includes a current collector and an electrode mixed material layer formed on the current collector, wherein the electrode mixed material layer is formed using the slurry composition for a secondary battery electrode set forth above. In other words, the electrode mixed material layer contains at least an electrode active material, a conductive material, and a binder that includes a copolymer (A) and another polymer. It should be noted that components contained in the electrode mixed material layer are components that are contained in the previously described slurry composition for a secondary battery electrode. Furthermore, the preferred ratio of these components in the electrode mixed material layer is the same as the preferred ratio of these components in the slurry composition.

In the presently disclosed electrode for a secondary battery, a highly uniform electrode mixed material layer can be favorably formed on the current collector using a slurry composition in which a conductive material is favorably dispersed as a result of a slurry composition that contains the presently disclosed binder composition for a secondary battery electrode being used. Accordingly, this electrode can be used to obtain a secondary battery in which charge concentration and occurrence of a side reaction due to conductive material aggregation are inhibited, and that has excellent battery characteristics such as output characteristics.

<Production Method of Electrode>

The presently disclosed electrode for a secondary battery can be produced, for example, through a step of applying the previously described slurry composition onto a current collector (application step) and a step of drying the slurry composition that has been applied onto the current collector to form an electrode mixed material layer on the current collector (drying step).

[Application Step]

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may be made of, for example, iron, copper, aluminum, nickel, stainless steel, titanium, tantalum, gold, or platinum. One of the aforementioned materials may be used individually, or two or more of the aforementioned materials may be used in combination in a freely selected ratio.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, an electrode mixed material layer can be formed on the current collector, thereby providing an electrode for a secondary battery that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector. Furthermore, when the electrode mixed material layer contains a curable polymer, the polymer is preferably cured after the electrode mixed material layer has been formed.

It should be noted that as a result of the conductive material and the like being favorably dispersed in the presently disclosed slurry composition for a secondary battery electrode, an electrode mixed material layer formed using this slurry composition has sufficiently high density and the internal structure thereof is not easily damaged even when the electrode mixed material layer is subjected to a pressing process. Accordingly, the battery characteristics of a secondary battery can be sufficiently improved through use of the presently disclosed slurry composition for a secondary battery electrode even in a case in which a pressing process or the like is performed in electrode production.

(Secondary Battery)

The presently disclosed secondary battery includes a positive electrode, a negative electrode, an electrolysis solution, and a separator. In the presently disclosed secondary battery, the presently disclosed electrode for a secondary battery is used as at least one of the positive electrode and the negative electrode. The presently disclosed secondary battery has excellent battery characteristics such as output characteristics as a result of including the presently disclosed electrode for a secondary battery.

The presently disclosed secondary battery is preferably a secondary battery in which the presently disclosed electrode for a secondary battery is used as a positive electrode. Although the following describes, as one example, a case in which the secondary battery is a lithium ion secondary battery, the presently disclosed secondary battery is not limited to the following example.

<Electrodes>

Known electrodes that are used in production of secondary batteries can be used without any specific limitations in the presently disclosed secondary battery as an electrode other than the electrode for a secondary battery set forth above. Specifically, an electrode obtained by forming an electrode mixed material layer on a current collector by a known production method may be used as an electrode other than the electrode for a secondary battery set forth above.

<Electrolysis Solution>

The electrolysis solution is normally an organic electrolysis solution obtained by dissolving a supporting electrolyte in an organic solvent. The supporting electrolyte of a lithium ion secondary battery may, for example, be a lithium salt. Examples of the lithium salt include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable in that they easily dissolve in solvent and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution is not specifically limited so long as the supporting electrolyte dissolves therein. Examples of suitable organic solvents that can be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable for their high dielectric constant and broad stable potential region, and a mixture of ethylene carbonate and ethyl methyl carbonate is more preferable.

The concentration of the electrolyte in the electrolysis solution can be adjusted as appropriate and may, for example, be preferably 0.5 mass % to 15 mass %, more preferably 2 mass % to 13 mass %, and even more preferably 5 mass % to 10 mass %. Known additives such as fluoroethylene carbonate and ethyl methyl sulfone may be added to the electrolysis solution.

<Separator>

Examples of separators that can be used include, but are not specifically limited to, those described in JP 2012-204303 A. Of these separators, a fine porous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the capacity per volume.

<Production Method of Secondary Battery>

The presently disclosed secondary battery may be produced, for example, by stacking the positive electrode and the negative electrode with the separator in-between, rolling or folding the resultant stack as necessary in accordance with the battery shape to place the stack in a battery container, injecting the electrolysis solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following, "%" and "parts" used to express quantities are by mass, unless otherwise specified.

The following methods were used in the examples and comparative examples to measure and evaluate the composition and Mooney viscosity of a copolymer, the BET specific surface area and dispersion stability of a conductive material, and the output characteristics of a secondary battery.

<Composition of Copolymer>

In the case of a copolymer that was dispersed in water (i.e., in a case in which mechanical shear force was not applied to the copolymer), the water dispersion of the copolymer was coagulated with methanol, and was then vacuum dried for 12 hours at a temperature of 60° C. to obtain a measurement sample. In a case in which mechanical shear force was applied to a copolymer, the copolymer itself was used as a measurement sample after being subjected to shear force.

The proportions of repeating units included in the measurement sample were measured by $^1$H-NMR.

<Mooney Viscosity of Copolymer>

In the case of a copolymer that was dispersed in water (i.e., in a case in which mechanical shear force was not applied to the copolymer), the water dispersion of the copolymer was coagulated with methanol, and was then vacuum dried for 12 hours at a temperature of 60° C. to obtain a measurement sample. In a case in which mechanical shear force was applied to a copolymer, the copolymer itself was used as a measurement sample after being subjected to shear force.

The Mooney viscosity ($ML_{1+4}$, 100° C.) was measured in accordance with JIS K 6300-1 at a temperature of 100° C. using 40 g of the measurement sample.

<BET Specific Surface Area of Conductive Material>

The BET specific surface area of a conductive material was measured in accordance with ASTM D3037-81 using a specific surface area meter.

<Dispersion Stability of Conductive Material>

The initial viscosity ($\eta_0$) of an obtained conductive material dispersion liquid was measured using a B-type viscometer (RB80L produced by Toki Sangyo Co., Ltd.) at a temperature of 25° C. and a rotation speed of 60 rpm.

The obtained conductive material dispersion liquid was left at rest without stirring and the occurrence of sedimentation of conductive material was checked after the dispersion liquid had been left for 5 days at 25° C. Moreover, redispersibility and the degree of viscosity recovery upon stirring were confirmed. Note that the conductive material dispersion liquid that had been left at rest was stirred at a rotation speed of 1,500 rpm for 1 minute, and then the post-resting viscosity ($\eta_1$) was measured at a rotation speed of 60 rpm and the degree of viscosity recovery was calculated by a formula ($\eta_1/\eta_0$)×100%. The dispersion stability of the conductive material was evaluated by the following criteria. A smaller amount of conductive material sedimentation and a larger degree of viscosity recovery indicate that more favorable and stable dispersion of the conductive material can be achieved.

A: Sedimentation does not occur

B: Sedimentation occurs but redispersion is achieved through stirring (degree of viscosity recovery: 80% or more)

C: Sedimentation occurs but redispersion is achieved through stirring (degree of viscosity recovery: at least 50% and less than 80%)

D: Sedimentation occurs but redispersion is achieved through stirring (degree of viscosity recovery: less than 50%)

E: Sedimentation occurs and redispersion is not achieved even through stirring

<Output Characteristics of Secondary Battery>

A produced secondary battery was constant-current charged at 0.2 CmA to a battery voltage of 4.2 V at an ambient temperature of 25° C. and was then constant-voltage charged at 4.2 V until the charging current reached 0.02 CmA. Next, the secondary battery was constant-current discharged at 0.2 CmA to a battery voltage of 3.0 V at an ambient temperature of 25° C. and the initial capacity of the secondary battery was measured. Thereafter, the secondary battery for which the initial capacity had been measured was constant-current charged at 0.2 CmA to a battery voltage of 4.2 V at an ambient temperature of 25° C. and was then constant-voltage charged at 4.2 V until the charging current reached 0.02 CmA. Next, the secondary battery was constant-current discharged at 2 CmA to a battery voltage of 3.0 V at an ambient temperature of 25° C. and the 2C capacity of the secondary battery was measured. An output characteristic (={(2C capacity)/(initial capacity)}×100%) was calculated and was evaluated by the following criteria.

A: Output characteristic of 90% or more
B: Output characteristic of at least 87% and less than 90%
C: Output characteristic of at least 84% and less than 87%
D: Output characteristic of at least 80% and less than 84%
E: Output characteristic of at least 75% and less than 80%
F: Output characteristic of at least 70% and less than 75%
G: Output characteristic of less than 70%

Example 1

<Production of Copolymer>

An autoclave equipped with a stirrer was charged with 240 parts of deionized water, 2.5 parts of sodium alkylbenzenesulfonate as an emulsifier, 35 parts of acrylonitrile as a nitrile group-containing monomer, and 0.65 parts of t-dodecyl mercaptan as a chain transfer agent in this order. The inside of the autoclave was purged with nitrogen and then 65 parts of 1,3-butadiene as a conjugated diene monomer was fed into the autoclave under pressure and 0.25 parts of ammonium persulfate was added as a polymerization initiator to perform a polymerization reaction at a reaction temperature of 40° C. Through this reaction, a copolymer of acrylonitrile and 1,3-butadiene was obtained. The polymerization conversion rate was 85%.

Deionized water was added to the resultant copolymer to obtain a solution adjusted to a total solid content concentration of 12 mass %. An autoclave of 1 L in capacity equipped with a stirrer was charged with 400 mL of the resultant solution (total solid content: 48 g), and nitrogen gas was passed through the solution for 10 minutes to remove dissolved oxygen present in the solution. Thereafter, 75 mg of palladium acetate as a hydrogenation reaction catalyst was dissolved in 180 mL of deionized water to which nitric acid had been added in an amount of 4 molar equivalents of the palladium (Pd), and the resultant solution was added into the autoclave. The system was purged twice with hydrogen gas, and then the contents of the autoclave were heated to 50° C. in a state in which the pressure was increased to 3 MPa with hydrogen gas and a hydrogenation reaction (first stage hydrogenation reaction) was performed for 6 hours.

The autoclave was subsequently returned to atmospheric pressure. Then, 25 mg of palladium acetate as a hydrogenation reaction catalyst was dissolved in 60 mL of deionized water to which nitric acid had been added in an amount of 4 molar equivalents of the Pd, and the resultant solution was added into the autoclave. The system was purged twice with hydrogen gas, and then the contents of the autoclave were heated to 50° C. in a state in which the pressure was increased to 3 MPa with hydrogen gas and a hydrogenation reaction (second stage hydrogenation reaction) was performed for 6 hours.

Next, the contents of the autoclave were returned to normal temperature and the system was changed to a nitrogen atmosphere. Thereafter, the contents were concentrated to a solid content concentration of 40% using an evaporator to yield a water dispersion of a copolymer.

The water dispersion of the copolymer was dripped into methanol to coagulate the copolymer, and then a coagulated material of the copolymer was vacuum dried for 12 hours at a temperature of 60° C. The obtained coagulated material was passed through rolls (roll spacing: 1 mm) five times to obtain a copolymer that had been subjected to mechanical shear force. The Mooney viscosity and composition of the resultant copolymer were measured. The results are shown in Table 1.

<Production of Binder Composition>

A binder composition containing a copolymer that included an alkylene structural unit (hydrogenated 1,3-butadiene unit) and a nitrile group-containing monomer unit (acrylonitrile unit) was obtained by adding N-methylpyrrolidone (NMP) as a solvent to the obtained copolymer and performing mixing thereof.

<Production of Conductive Material Dispersion Liquid>

A conductive material paste composition was obtained by stirring 100 parts of acetylene black (BET specific surface area: 133 m$^2$/g; average particle diameter: 23 nm) as a conductive material, 20 parts in terms of solid content of the binder composition, and an appropriate amount of NMP using a disper blade (2,000 rpm, 60 minutes). In addition, 80 parts of polyvinylidene fluoride (#7208 produced by Kureha Corporation) as another polymer was added to the conductive material paste composition, and stirring was performed by the disper blade (2,000 rpm, 60 minutes). Thereafter, a bead mill in which zirconia beads of 3 mm in diameter were used was used to perform mixing for 30 minutes at a rotation speed of 350 rpm to produce a conductive material dispersion liquid having a solid content concentration of 12%. The conductive material dispersion liquid had a viscosity of 4,000 mPa·s as measured by a B-type viscometer (RB80L produced by Toki Sangyo Co., Ltd.) at a temperature of 25° C. and a rotation speed of 60 rpm.

The obtained conductive material dispersion liquid was used to evaluate the dispersion stability of the conductive material. The results are shown in Table 1.

<Production of Slurry Composition for Secondary Battery Positive Electrode>

A slurry composition for a positive electrode was obtained by using a disper blade to stir 100 parts of LiCoO$_2$ as a positive electrode active material and 4 parts in terms of solid content of the conductive material dispersion liquid for 30 minutes at a rotation speed of 2,500 rpm. The slurry composition for a positive electrode had a viscosity of 2,000 mPa·s as measured by a B-type viscometer (RB80L produced by Toki Sangyo Co., Ltd.) at a temperature of 25° C. and a rotation speed of 60 rpm.

<Production of Positive Electrode for Secondary Battery>

Aluminum foil of 18 μm in thickness was prepared as a current collector. The obtained slurry composition was applied onto one side of the aluminum foil using a comma coater such as to have a coating weight after drying of 20 mg/cm$^2$, and was dried for 30 minutes at 120° C. to obtain a positive electrode web. The positive electrode web was then rolled by roll pressing to produce both a positive electrode including a positive electrode mixed material layer having a density of 3.8 g/cm$^3$ (positive electrode mixed material layer thickness: 53 μm) and a positive electrode including a positive electrode mixed material layer having a density of 4.2 g/cm$^3$ (positive electrode mixed material layer thickness: 48 μm).

<Production of Negative Electrode for Secondary Battery>

A planetary mixer equipped with a disper blade was charged with 100 parts of artificial graphite (volume-average particle diameter: 24.5 μm, specific surface area: 4 m$^2$/g) as a negative electrode active material and 1 part in terms of solid content of a 1% aqueous solution of carboxymethyl cellulose (BSH-12 produced by DKS Co., Ltd.) as a dispersant. The contents of the planetary mixer were adjusted to a solid content concentration of 55% with deionized water and were then mixed for 60 minutes at 25° C. Next, the solid content concentration was adjusted to 52% with deionized water. Thereafter, mixing was performed for 15 minutes at 25° C. to yield a mixed liquid.

Next, 1.0 parts in terms of solid content of a 40% water dispersion of a styrene-butadiene copolymer (glass transition temperature: −15° C.) as a binder and deionized water were added to the mixed liquid obtained as described above, the final solid content concentration was adjusted to 50%, and mixing was performed for 10 minutes. The resultant mixed liquid was subjected to a defoaming process under reduced pressure to yield a slurry composition for a negative electrode having good fluidity.

The obtained slurry composition for a negative electrode was applied onto copper foil (current collector) of 20 μm in thickness using a comma coater such as to have a film thickness after drying of approximately 150 μm. The slurry composition for a negative electrode was then dried by conveying the copper foil inside of a 60° C. oven for 2 minutes at a speed of 0.5 m/minute. Heat treatment was subsequently performed for 2 minutes at 120° C. to obtain a negative electrode web. The negative electrode web was rolled by roll pressing to obtain a negative electrode including a negative electrode mixed material layer of 80 μm in thickness.

<Preparation of Separator for Secondary Battery>

A single layer separator made of polypropylene (width: 65 mm, length: 500 mm, thickness: 25 μm, produced by a dry method, porosity: 55%) was cut out as a 5 cm×5 cm square.

<Production of Secondary Battery>

The positive electrodes including the positive electrode mixed material layers of differing density were each used to produce a secondary battery.

Specifically, an aluminum packing case was prepared as a battery case. The positive electrode obtained as described above was cut out as a 4 cm×4 cm square and was positioned such that a surface at the current collector side of the positive electrode was in contact with the aluminum packing case. The square separator obtained as described above was positioned on the positive electrode mixed material layer of the positive electrode. The negative electrode obtained as described above was cut out as a 4.2 cm×4.2 cm square and was positioned on the separator such that a surface at the negative electrode mixed material layer side of the negative electrode faced the separator. The aluminum packing case was then filled with an electrolysis solution formed from a LiPF$_6$ solution of 1.0 M in concentration that contained 1.5% of vinylene carbonate (VC). The solvent of the LiPF$_6$ solution was a mixed solvent of ethylene carbonate (EC) and ethyl methyl carbonate (EMC) (EC/EMC=3/7 (volume ratio)). The aluminum packing case was then closed by heat sealing at 150° C. to tightly seal an opening of the aluminum packing case, and thereby obtain a lithium ion secondary battery.

The obtained lithium ion secondary batteries were used to evaluate output characteristics both for the case in which the positive electrode including the positive electrode mixed material layer of 3.8 g/cm$^3$ in density was used and the case in which the positive electrode including the positive electrode mixed material layer of 4.2 g/cm$^3$ in density was used. The results are shown in Table 1.

Example 2

A copolymer, a binder composition, a conductive material dispersion liquid, a slurry composition, a positive electrode, a negative electrode, and a secondary battery were produced in the same way as in Example 1 with the exception that in production of the copolymer, the amount of t-dodecyl mercaptan was changed to 0.85 parts and the water dispersion of the copolymer was used to measure the Mooney viscosity and composition of the copolymer without performing coagulation of the copolymer using methanol and application of shear force using rolls, and in production of the binder composition, 320 parts of N-methylpyrrolidone (NMP) as a solvent was added to 100 parts of the water dispersion of the copolymer, and water was evaporated under reduced pressure to obtain a binder composition containing a copolymer that included an alkylene structural unit (hydrogenated 1,3-butadiene unit) and a nitrile group-containing monomer unit (acrylonitrile unit). Moreover, evaluations were performed in the same way as in Example 1. The results are shown in Table 1.

Example 3

A copolymer, a binder composition, a conductive material dispersion liquid, a slurry composition, a positive electrode, a negative electrode, and a secondary battery were produced in the same way as in Example 1 with the exception that the number of passes of the coagulated material through the rolls in production of the copolymer was changed to 2. Moreover, evaluations were performed in the same way as in Example 1. The results are shown in Table 1.

Example 4

A copolymer, a binder composition, a conductive material dispersion liquid, a slurry composition, a positive electrode, a negative electrode, and a secondary battery were produced in the same way as in Example 1 with the exception that the amount of t-dodecyl mercaptan used in production of the copolymer was changed to 0.70 parts. Moreover, evaluations were performed in the same way as in Example 1. The results are shown in Table 1.

Example 5

A copolymer, a binder composition, a conductive material dispersion liquid, a positive electrode, a negative electrode, and a secondary battery were produced in the same way as in Example 1 with the exception that in production of the copolymer, 20 parts of n-butyl acrylate as a (meth)acrylic acid ester monomer was charged to the autoclave with 35 parts of acrylonitrile, the amount of t-dodecyl mercaptan was changed to 0.75 parts, and the amount of 1,3-butadiene was changed to 45 parts. Moreover, evaluations were performed in the same way as in Example 1. The results are shown in Table 1.

Examples 6 and 7

A copolymer, a binder composition, a conductive material dispersion liquid, a slurry composition, a positive electrode, a negative electrode, and a secondary battery were produced in the same way as in each of Examples 1 and 5 with the exception that in production of the conductive material dispersion liquid, 100 parts of multi-walled carbon nanotubes FloTube 9110 (BET specific surface area: 200 $m^2/g$; average diameter: 10 nm; average length 10 μm) were used instead of acetylene black (BET specific surface area: 133 $m^2/g$; average particle diameter: 23 nm), the amount of the binder composition was changed to 2 parts in terms of solid content, the amount of polyvinylidene fluoride (#7208 produced by Kureha Corporation) was changed to 8 parts, and the solid content concentration of the conductive material dispersion liquid was changed to 2%, and in production of the slurry composition, the amount of the conductive material dispersion liquid was changed to 0.55 parts in terms of solid content. Moreover, evaluations were performed in the same way as in Example 1. The results are shown in Table 1.

Examples 8 and 9

A copolymer, a binder composition, a conductive material dispersion liquid, a slurry composition, a positive electrode, a negative electrode, and a secondary battery were produced in the same way as in each of Examples 1 and 5 with the exception that acetylene black having a BET specific surface area of 39 $m^2/g$ and an average particle diameter of 48 nm was used instead of acetylene black having a BET specific surface area of 133 $m^2/g$ and an average particle diameter of 23 nm in production of the conductive material dispersion liquid. Moreover, evaluations were performed in the same way as in Example 1. The results are shown in Table 1.

Comparative Example 1

A copolymer, a binder composition, a conductive material dispersion liquid, a slurry composition, a positive electrode, a negative electrode, and a secondary battery were produced in the same way as in Example 1 with the exception that in production of the copolymer, the amount of t-dodecyl mercaptan was changed to 0.45 parts and the water dispersion of the copolymer was used to measure the Mooney viscosity and composition of the copolymer without performing coagulation of the copolymer using methanol and application of shear force using rolls, and in production of the binder composition, 320 parts of N-methylpyrrolidone (NMP) as a solvent was added to 100 parts of the water dispersion of the copolymer, and water was evaporated under reduced pressure to obtain a binder composition containing a copolymer that included an alkylene structural unit (hydrogenated 1,3-butadiene unit) and a nitrile group-containing monomer unit (acrylonitrile unit). Moreover, evaluations were performed in the same way as in Example 1. The results are shown in Table 1.

Comparative Example 2

A copolymer, a binder composition, a conductive material dispersion liquid, a slurry composition, a positive electrode, a negative electrode, and a secondary battery were produced in the same way as in Example 1 with the exception that in production of the copolymer, the amount of t-dodecyl mercaptan was changed to 0.05 parts and the water dispersion of the copolymer was used to measure the Mooney viscosity and composition of the copolymer without performing coagulation of the copolymer using methanol and application of shear force using rolls, and in production of the binder composition, 320 parts of N-methylpyrrolidone (NMP) as a solvent was added to 100 parts of the water dispersion of the copolymer, and water was evaporated under reduced pressure to obtain a binder composition containing a copolymer that included an alkylene structural unit (hydrogenated 1,3-butadiene unit) and a nitrile group-containing monomer unit (acrylonitrile unit). Moreover, evaluations were performed in the same way as in Example 1. The results are shown in Table 1.

Comparative Example 3

A slurry composition, a positive electrode, a negative electrode, and a secondary battery were produced in the same way as in Example 1 with the exception that a copolymer, a binder composition, and a conductive material dispersion liquid were not produced, and in production of the slurry composition for a secondary battery positive electrode, the slurry composition for a positive electrode was obtained by using a disper blade to stir 100 parts of $LiCoO_2$ as a positive electrode active material, 2 parts of acetylene black (BET specific surface area: 133 $m^2/g$; average particle diameter: 23 nm) as a conductive material, 2 parts of polyvinylidene fluoride (#7208 produced by Kureha Corporation) as another polymer, and an appropriate amount of NMP for 30 minutes at a rotation speed of 2,500 rpm. Moreover, evaluations were performed in the same way as in Example 1. In addition, a conductive material dispersion liquid having a solid content concentration of 12% was produced without using a binder composition by stirring (2,000 rpm, 60 minutes) 100 parts of acetylene black (BET specific surface area: 133 m$^2$/g; average particle diameter: 23 nm) as a conductive material, an appropriate amount of NMP, and 100 parts of polyvinylidene fluoride (#7208 produced by Kureha Corporation) as another polymer using a disper blade, and then using a bead mill in which zirconia beads of 3 mm in diameter were used to perform mixing for 30 minutes at a rotation speed of 350 rpm. The dispersion stability of the conductive material was evaluated in the same way as in Example 1. The results are shown in Table 1.

In Table 1, shown below:
"AB" indicates acetylene black;
"CNT" indicates carbon nanotubes;
"H-BD" indicates hydrogenated 1,3-butadiene unit;
"AN" indicates acrylonitrile unit;
"BA" indicates n-butyl acrylate unit;
"TDM" indicates t-dodecyl mercaptan; and
"PVDF" indicates polyvinylidene fluoride.

TABLE 1

| | | | | Example 1 | Example 2 | Example 3 | Example 4 | Example 5 | Example 6 |
|---|---|---|---|---|---|---|---|---|---|
| Slurry composition | Positive electrode active material (LiCoO$_2$) | | Amount [parts by mass] | 100 | 100 | 100 | 100 | 100 | 100 |
| | Conductive material | | Type | AB | AB | AB | AB | AB | CNT |
| | | | BET specific surface area [m$^2$/g] | 133 | 133 | 133 | 133 | 133 | 200 |
| | | | Amount [parts by mass] | 2 | 2 | 2 | 2 | 2 | 0.5 |
| | Binder | Copolymer | Composition H-BD [mass %] | 65 | 65 | 65 | 65 | 45 | 65 |
| | | | AN [mass %] | 35 | 35 | 35 | 35 | 35 | 35 |
| | | | BA [mass %] | — | — | — | — | 20 | — |
| | | | Amount of chain transfer agent (TDM) [parts by mass/100 parts by mass of monomer] | 0.65 | 0.85 | 0.65 | 0.70 | 0.75 | 0.65 |
| | | | Mechanical shear | Yes | No | Yes | Yes | Yes | Yes |
| | | | Roll pass count (spacing: 1 mm) [passes] | 5 | — | 2 | 5 | 5 | 5 |
| | | | Mooney viscosity (ML$_{1+4}$, 100° C.) [—] | 20 | 10 | 30 | 10 | 20 | 20 |
| | | | Other polymer | PVDF | PVDF | PVDF | PVDF | PVDF | PVDF |
| | | | Content ratio (copolymer/other polymer) [mass ratio] | 20/80 | 20/80 | 20/80 | 20/80 | 20/80 | 20/80 |
| | | | Amount (in terms of solid content) [parts by mass] | 2 | 2 | 2 | 2 | 2 | 0.05 |
| Evaluation | | | Dispersion stability of conductive material | A | B | B | B | B | A |
| | | | Output characteristics (positive electrode mixed material layer density: 3.8 g/cm$^3$) | B | B | B | B | C | A |
| | | | Output characteristics (positive electrode mixed material layer density: 4.2 g/cm$^3$) | C | C | D | C | C | B |

| | | | | Example 7 | Example 8 | Example 9 | Comparative Example 1 | Comparative Example 2 | Comparative Example 3 |
|---|---|---|---|---|---|---|---|---|---|
| Slurry composition | Positive electrode active material (LiCoO$_2$) | | Amount [parts by mass] | 100 | 100 | 100 | 100 | 100 | 100 |
| | Conductive material | | Type | CNT | AB | AB | AB | AB | AB |
| | | | BET specific surface area [m$^2$/g] | 200 | 39 | 39 | 133 | 133 | 133 |
| | | | Amount [parts by mass] | 0.5 | 2 | 2 | 2 | 2 | 2 |
| | Binder | Copolymer | Composition H-BD [mass %] | 45 | 65 | 45 | 65 | 65 | — |
| | | | AN [mass %] | 35 | 35 | 35 | 35 | 35 | — |
| | | | BA [mass %] | 20 | — | 20 | — | — | — |
| | | | Amount of chain transfer agent (TDM) [parts by mass/100 parts by mass of monomer] | 0.75 | 0.65 | 0.75 | 0.45 | 0.05 | — |
| | | | Mechanical shear | Yes | Yes | Yes | No | No | — |
| | | | Roll pass count (spacing: 1 mm) [passes] | 5 | 5 | 5 | — | — | — |
| | | | Mooney viscosity (ML$_{1+4}$, 100° C.) [—] | 20 | 20 | 20 | 70 | 240 | — |
| | | | Other polymer | PVDF | PVDF | PVDF | PVDF | PVDF | PVDF |
| | | | Content ratio (copolymer/other polymer) [mass ratio] | 20/80 | 20/80 | 20/80 | 20/80 | 20/80 | 0/100 |
| | | | Amount (in terms of solid content) [parts by mass] | 0.05 | 2 | 2 | 2 | 2 | 2 |
| Evaluation | | | Dispersion stability of conductive material | B | A | A | C | C | E |
| | | | Output characteristics (positive electrode mixed material layer density: 3.8 g/cm$^3$) | B | C | D | D | E | E |
| | | | Output characteristics (positive electrode mixed material layer density: 4.2 g/cm$^3$) | B | D | D | G | G | G |

It can be seen from Table 1 that in the case of Examples 1 to 9 in which a binder composition for a secondary battery electrode was used that contained a copolymer including an alkylene structural unit and a nitrile group-containing monomer unit, and having a specific Mooney viscosity, it was possible to favorably disperse a conductive material, and thereby obtain a secondary battery having excellent output characteristics.

Moreover, it can be seen from Table 1 that in the case of Comparative Examples 1 to 3 in which a binder composition containing a copolymer that did not have a specific Mooney viscosity was used or only a copolymer that did not include an alkylene structural unit and a nitrile group-containing monomer unit was used, it was not possible to favorably disperse a conductive material, and the obtained secondary battery had reduced output characteristics.

Examples 10 to 13

A copolymer, a binder composition, and a conductive material dispersion liquid were produced in the same way as in Example 1 with the exception that in production of the conductive material dispersion liquid, the amount of the binder composition and the amount of polyvinylidene fluoride used as the other polymer were changed, and the content ratio of polyvinylidene fluoride was changed as shown in Table 2. The obtained conductive material dispersion liquid was used to evaluate dispersion stability of the conductive material in the same way as in Example 1, and to thereby examine the influence of the content ratio of polyvinylidene fluoride on dispersion stability of the conductive material. The results are shown in Table 2.

TABLE 2

|  | Example 1 | Example 10 | Example 11 | Example 12 | Example 13 |
| --- | --- | --- | --- | --- | --- |
| Content ratio (copolymer/ other polymer) [mass ratio] | 20/80 | 10/90 | 30/70 | 50/50 | 70/30 |
| Dispersion stability of conductive material | A | A | B | C | C |

It can be seen from Table 2 that conductive material dispersion stability can be further improved through adjustment of the content ratio of polyvinylidene fluoride used as the other polymer.

INDUSTRIAL APPLICABILITY

According to this disclosure, it is possible to provide a binder composition for a secondary battery electrode and a conductive material paste composition for a secondary battery electrode that enable favorable dispersion of a conductive material when used in production of a slurry composition for a secondary battery electrode.

Moreover, according to this disclosure, it is possible to provide a slurry composition for a secondary battery electrode in which a conductive material is favorably dispersed.

Furthermore, according to this disclosure, it is possible to provide an electrode for a secondary battery that enables sufficient improvement of battery characteristics of a secondary battery and a secondary battery having excellent battery characteristics such as output characteristics.

The invention claimed is:

1. A binder composition for a secondary battery electrode comprising:
   a copolymer including an alkylene structural unit and a nitrile group-containing monomer unit; and
   a solvent, wherein
   the copolymer has a Mooney viscosity ($ML_{1+4}$, 100° C.) of 40 or less.

2. The binder composition for a secondary battery electrode according to claim 1, wherein
   the copolymer includes the alkylene structural unit in a proportion of at least 40 mass % and not more than 80 mass %.

3. The binder composition for a secondary battery electrode according to claim 1, wherein
   the copolymer includes the nitrile group-containing monomer unit in a proportion of at least 10 mass % and not more than 55 mass %.

4. The binder composition for a secondary battery electrode according to claim 1, wherein
   the copolymer does not substantially include a hydrophilic group-containing monomer unit.

5. A conductive material paste composition for a secondary battery electrode comprising:
   the binder composition for a secondary battery electrode according to claim 1; and
   a conductive material.

6. The conductive material paste composition for a secondary battery electrode according to claim 5, wherein
   the conductive material has a BET specific surface area of at least 100 $m^2/g$ and not more than 2,500 $m^2/g$.

7. A slurry composition for a secondary battery electrode comprising:
   an electrode active material;
   a conductive material;
   the binder composition for a secondary battery electrode according to claim 1; and
   a polymer other than the copolymer.

8. The slurry composition for a secondary battery electrode according to claim 7, wherein
   the conductive material has a BET specific surface area of at least 100 $m^2/g$ and not more than 2,500 $m^2/g$.

9. An electrode for a secondary battery comprising an electrode mixed material layer formed using the slurry composition for a secondary battery electrode according to claim 7.

10. A secondary battery comprising the electrode for a secondary battery according to claim 9.

* * * * *